United States Patent Office 3,662,058
Patented May 9, 1972

3,662,058
UTILIZATION OF MOLTEN SLAG FROM METALLURGICAL FURNACE IN MANUFACTURE OF FUSED CAST REFRACTORY SHAPES
Giovanni Crespi, Milan, Italy, assignor to Siderpatents, S.A., Lugano, Switzerland
No Drawing. Filed Jan. 21, 1969, Ser. No. 792,792
Claims priority, application Switzerland, Feb. 20, 1968, 2,439/68
Int. Cl. C04b 5/00, 35/62, 35/02
U.S. Cl. 264—332
17 Claims

ABSTRACT OF THE DISCLOSURE

Dolomite or magnesite either preheated or at room temperature is added directly to the molten slag in the furnace during the normal processing of a "heat" to raise the melting point of the slag-refractory mixture to at least 1800° C. This modified slag mixture is then cast into molds to form refractory shapes. Granular refractory material can also be added to the mold either prior to or simultaneous with the addition of the modified slag.

BACKGROUND OF THE INVENTION

Field of the invention

The present invention relates to a process for the production of a basic refractory composition, particularly for use in the lining of steel furnaces; it relates also to the basic refractory linings obtained by this process, in form of a one-piece lining or through moulded blocks or prefabricated elements in general.

Description of the prior art

It is known that at the present time the refractory lining of steel furnaces is obtained, according to one known method, by means of bricks or similar small blocks based essentially on magnesia or other special highly refractory mixtures, these elements having optimum refractory characteristics and a long life, although their cost is nevertheless extremely high.

According to another known method, mixtures based on dolomite and/or magnesite in the form of powder, granules and larger pieces are preferably employed; these materials, together with binders based on silicates, alkali hydrates, solutions of sulphates, or based on tar, pitch or bitumens, are compressed in moulds to produce blocks or prefabricated lining elements in general, or directly in the furnace to produce a monolithic lining, for example for forming the hearth or sole. This method provides elements which have optimum technical characteristics at a cost which is distinctly lower, but these elements nevertheless do not always meet the new requirements of the iron and steel industry.

SUMMARY OF THE INVENTION

The present invention relates to a process for the production of a basic refractory composition, particularly for use in the lining of steel furnaces, which is characterised in that said refractory composition is obtained in a molten or semimolten state at 1700°-2000°-2500° C. by mixing dolomite and/or magnesite with grey-black steelmaking slag directly in the melting furnace during the normal processing of the heat. More precisely, the dolomite and/or magnesite is or are introduced into the melting furnace in the form of powder and granules which, at the temperature at which the heat is normally processed, are brought into the molten or semi-molten state and float as slag, said molten or semi-molten composition being preferably composed of 65–95% of dolomite and/or magnesite and 35–5% of grey-black basic slag.

By the term "grey-black basic slag" is meant, according to the most normal accepted meaning, a steelmaking slag of a basic nature containing 48–60% of CaO and which may also have a gradation in colouring from grey-black to brown.

It is very interesting to note that the introduction of dolomite and/or magnesite into the melting furnace does not interfere at all with the processing of the heat, there occurring only a slight harmless absorption of heat. Actually, in some cases, the ability of the dolomite to develop a scorifying action on the molten metal has been detected.

At the melting furnace temperature of 1700–2500° C., the dolomite and/or magnesite reaches or reach a pasty, semi-molten state and floats or float in the form of substantially amalgamated slag.

According to the present invention, this molten or semi-molten composition is then used by casting it directly in moulds, preferably for the production of blocks or of prefabricated refractory-lining elements in general; these elements are characterised essentially in that they are constituted by a refractory composition of a basic nature comprising 65–95% by weight of dolomite and/or magnesite, the remaining portion being grey-black basic steelmaking slag.

The use of this refractory basic slag has proved to be surprisingly advantageous, both from the economic aspect and because of the refractory technical characteristics of the finished product. It has been observed, in particular, that the refractory elements formed have a melting point higher than 1800–1900° C. and have a ceramic bond which, in comparison with the tar-based bond according to the known technique, allows to obtain, for an equal operating temperature, a greater cohesion and density, a reduced flaking at high temperatures and a greater resistance to mechanical stresses as opposed to the refractory mixtures heretofore employed.

DESCRIPTION OF THE PREFERRED EMBODIMENTS

For the application of the process according to the present invention, the procedure adopted is more particularly as follows: the materials in the form of powder and/or granules and constituted at least as to 70–90% by dolomite and/or magnesite are charged into the furnace, preferably after the first slag which has been formed (which is too oxidized and/or saturated with various impurifies) has already been removed. The consideration of when a slag is too oxidized and/or saturated with various impurities is left entirely to the producer, since it is possible to obtain a molten or semi-molten refractory material of excellent refractory characteristics when the slag percentage is very low (near to 5%) and when the slag contains few impurities. This material, besides being better from the technical point of view, is also more expensive. Whereas, if one wishes a less refractory and thus less expensive material, one can increase the slag percentage (up to 30%) and allow this slag to contain a higher amount of impurities. After a period of about 40–100 minutes, the molten or semi-molten composition or mass is collected and poured directly in moulds; this period is naturally in proportion to the quantity of material introduced into the furnace. In arc furnaces, in which two or three charges of scrap are generally effected for each heat, it is possible to obtain the formation of the molten or semi-molten composition according to the invention during the melting of one of the charges, either in the course of the initial period or of the final period of the processing of the heat. Finally, it may also be expedient to effect the preparation of this refractory composition only in the last heats of the furnace before the lining is completely remade; in each case, after the molten or semi-molten refractory composition has been collected, the normal processing of the metal bath can be continued, the known scorifying materials being charged on to the same.

In special circumstances, for example when it is desired to produce a large quantity of refractory composition, it has been found that it is possible to obtain the refractory basic slag up to an amount of ¼–½ by weight of the melting bath, in this case, the volume of the metal bath is reduced to ⅓–¼ of the capacity of the furnace, thereby rendering a large volume available for a series of successive charges of refractory material. More particularly, in the case where the molten or semi-molten composition is prepared in an oxygen converter, it is possible to charge the refractory material in the form of powder or granules in an amount equal to up to 4–6 times the amount of scorifying materials normally used. When the molten or semi-molten refractory basic slag compositions is extracted from the furnace, it can be used directly, as is indicated hereinafter, or transferred to heating furnaces for waiting purposes, in which it is possible to maintain the slag in the molten or semi-molten state and, if necessary, make additions of material for suitable corrections of the refractory product.

According to one form of application of the present invention, it is possible, after obtaining the refractory basic slag in the form of a molten or semi-molten composition or mass, to pour this composition in a mould simultaneously with a quantity of solid refractory material. In this case, the solid refractory material is preferably in the form of powder, granules and pieces up to sizes of 130 mm. The solid refractory material may also be placed in the mould beforehand; a material with dimensions between 70 and 730 mm. is then preferred and is deposited in alternate layers with the molten or semi-molten refractory basic slag, so that the molten composition fills the gaps between these large pieces in order to produce once more a prefabricated element of high density. The precentage of non-molten solid material may also reach 50–65% of the total material in the finished prefabricated element; with high percentages of non-molten material, however, it is appropriate to employ also a moderate amount of fine material or granules. Before the pouring of the molten or semi-molten refractory material in the mould, it is possible to arrange in the mould itself a metal frame provided with supports emerging from the mould and by means of which it is possible to effect the transport of the finished prefabricated element; if necessary, the metal frame is covered beforehand, for example painted, with an insulating or refractory coating. In order to obtain a mass which is more satisfactorily bound, it is moreover possible to insert in the same metal blanks, pieces of iron rod or steel cuttings, in accordance with a technique known per se.

As has been said above, the material employed for the preparation of the molten, or semi-molten composition is constituted at least as to 70–90% by dolomite and/or magnesite; it is also possible, however, to use additions of clay, kaolin (containing alumina in an amount greater than 40%) natural magnesian silicates, bauxite and chromite.

The following mixtures of materials, added in amounts of 65–95% to the grey-black basic slag, have given optimum practical results. These mixtures may, however, be charged into the furnace directly with the metal scrap to be melted, with which they develop a scorifying action and readily form the refractory molten or semi-molten composition according to the invention the possibility of making corrective additions before extracting the refractory composition is obviously not excluded.

|   |   | Percent |
|---|---|---|
| 1. | Calcined dolomite | 70–90 |
|   | Calcined magnesite | 10–30 |
| 2. | Calcined dolomite | 70 |
|   | Calcined magnesite | 20 |
|   | Bauxite | 10 |
| 3. | Calcined dolomite | 100 |
| 4. | Dolomite | 60–80 |
|   | Natural magnesian silicates [1] | 40–20 |
| 5. | Calcined dolomite | 50 |
|   | Calcined magnesite | 30 |
|   | Refractory clay (42% $Al_2O_3$) | 10 |
|   | Natural magnesian silicates | 10 |
| 6. | Calcined dolomite | 60 |
|   | Calcined magnesite | 20 |
|   | Natural chromite | 20 |
| 7. | Magnesite | 60 |
|   | Chromite | 20 |
|   | Natural magnesian silicate | 20 |
| 8. | Magnesite | 80 |
|   | Natural magnesian silicates | 20 |

[1] Complex silicates having an MgO content from 30 to 55%.

For use in linings subjected to relatively little stress, the refractory composition may, for example, be based essentially on bauxite and/or sillimanite, the proportion of dolomite and/or magnesite being even reduced to values below 15–25%.

The terms dolomite and magnesite refer to known basic refractory materials (used in steelmaking) which are obtained by the prior calcination of natural dolomite or magnesite at 1800–2200° C.; it is also possible, however, to make use of the same natural materials, either crude or, if necessary calcined at 800–1000° C., at least for that portion which is treated in the furnace and obtained as slag. Of course, the various percentages of constitutents appearing in the above examples are given by way of indication and are not of a restrictive nature, but can be varied in relation to the desired refractory characteristics, the binding action and the cost; for uses where particularly great stresses occur, the MgO content is increased and it is sought to obtain a proportion of MgO of 50 to 85%; for ordinary uses, the refractory mixture is made up with the most economic products and an MgO content of 30 to 48% is sufficient.

According to one embodiment of the present invention, the prefabricated elements are produced in moulds having walls of sheet metal which are expendable; according to a variant, it is also possible, however, to use sheet-metal moulds to the inner surfaces of which there has been applied beforehand a refractory layer 5 to 20 mm. thick. In both cases, and particularly when the prefabricated elements are of large dimensions, it is appropriate to effect the pouring of the molten or semi-molten refractory composition in successive layers which are superposed or disposed side by side; in this case, it is also possible to differentiate the refractory characteristic of the layers by making use of material having higher refractory properties for those layers facing towards the interior of the furnace. The pouring is effected directly or by means of a preheated ladle in purpose-made moulds or dies; according to a technique known per se, the moulds and/or dies may be mounted on apparatuses adapted to transmit a rotary and/or vibrating movement for the purpose of improving the densification of the refractory material. In this way, it is possible to obtain large lining blocks for the walls of arc furnaces, elements for forming the crowns of furnaces, blocks for oxygen converters, blocks for soles or hearths, lining elements for ladles, feedhead elements or complete feedheads. For the purpose of improving the over-all characteristics of cohesion and strength, these prefabricated elements mays be subjected to reheating treatments at 900–800° C.

With the refractory basis slag obtained as hereinbefore indicated, it is also possible, however, to produce one-piece refractory linings directly in situ, both in the case of the formation of complete furnace hearths and in the case of the formation of walls or wall elements.

It is understood that what has been described hereinbefore is purely in example and that both the product and the process which have been described are open to all variations which may be suggested from time to time by those skilled in the art in relation to the material employed or the processing conditions, without thereby departing from the scope of the invention. In particular, within the field of the invention comes the preparation of at least part of the refractory mixtures already in the molten or semi-molten state, for example at 1800°–2500° C., in a suitable furnace, and then the mixing with the molten slag only at the time of the pouring in moulds. Equally, there is no limitation as regards the type of melting bath or the type of furnace in which it is possible to prepare the molten or semi-molten composition of the invention, it being possible to operate in baths of cast iron, or ordinary or special steels, or of stainless steels and in arc furnaces and furnaces employing liquid or gaseous fuels or in an oxygen, LD type, Kaldo, rotor converter and the like.

Finally, the invention also covers the case in which the refractory basic slag is cooled, reduced to granules and powder and employed in the known processes for preparing prefabricated lining elements by cold compression, in general, it is a question of using the refractory slag obtained as described hereinbefore as a raw material for refractory products.

I claim:
1. A process for producing basic cast type refractory elements, comprising the steps of:
   (a) normally processing a heat in a steel making furnace at a temperature of 1800°–2500° C. whereby grey-back steel slag is produced;
   (b) introducing into the grey-black slag floating on the steel bath a refractory material comprising dolomite or magnesite or a combination of both in sufficient quantity to bring the melting point of the slag-refractory material mixture to at least 1800° C. whereby it becomes intermixed with said slag at the normal temperature of the heat;
   (c) removing from the top of the heat the floating mixture of steel slag and said refractory material in a molten or semi-molten mouldable condition and casting it into moulds of desired shape suitable for use as a refractory lining material;
   (d) permitting the moulded shape mixture to cool and solidify.

2. Process as in claim 1 wherein said melting furnace is preferably an arc furnace.

3. Process as in claim 1, wherein the weight of the molten or semi-molten refractory basic slag composition may reach up to ¼–½ of the weight of the metal bath.

4. Process as in claim 3, wherein in oxygen converters, the amount of refractory material which is charged for forming the molten or semi-molten refractory composition is equal to 4–6 times the amount of scorifying agent normally used.

5. The process of claim 1, said floating mixture comprising from 65 to 95% dolomite and/or magnesite and 5 to 35% grey-black steel slag.

6. The process of claim 1, wherein the refractory, material added to the slag comprises at least 70% dolomite and/or magnesite and up to 30% of one or more of the following materials: clay, kaolin with more than 40% of $Al_2O_3$, natural magnesian silicates, bauxite, chromite.

7. The process of claim 1, the refractory material which is introduced into the furnace being in particulate form whose particles do not exceed 130 mm. in size.

8. The process of claim 1, wherein the mouldable material derived in step (c) is poured into a mould defining a one-piece wall of a furnace.

9. The process of claim 1, wherein the mouldable material derived in step (c) is poured into moulds, each of which defines the configuration of a single block suitable for building up a furnace wall, said material being permitted to cool and to solidify in said moulds.

10. Process as in claim 9, wherein said molten or semi-molten mixture is poured into moulds simultaneously with solid basic refractory material in the form of powder, granules and/or pieces of dimensions up to 120 mm.

11. Process as in claim 10, wherein said refractory material which is poured into moulds together with the molten or semi-molten mixture is heated beforehand.

12. Process as in claim 9, wherein said molten or semi-molten mixture is poured into a mould in which is already contained a quantity of solid basic refractory material constituting not greater than 65% of the total final mass.

13. Process as in claim 12, wherein said solid refractory material is preferably in pieces of dimensions ranging between 70 and 130 mm. and the molten or semi-molten mixture fills the gaps between these pieces.

14. Process as in claim 9, wherein said molten or semi-molten mixture is poured in moulds having expendable sheet-metal walls.

15. Process as in claim 9, wherein said molten or semi-molten mixture is poured in moulds with sheetmetal walls lined internally with a layer of refractory material with a thickness not greater than 5–20 mm.

16. Process as in claim 1, wherein said furnace is of the conventional type which employs liquid or gaseous fuel.

17. Process as in claim 1, wherein the refractory material is pre-heated to a temperature in the range of 1800 to 2500° C. and is then mixed with the basic slag.

References Cited

UNITED STATES PATENTS

| | | | |
|---|---|---|---|
| 292,508 | 1/1884 | Reese | 264—30 |
| 1,704,902 | 3/1929 | Rohn | 264—30 |
| 2,284,797 | 6/1942 | Blan et al. | 264—30 |
| 2,358,652 | 9/1944 | Nicholas | 264—30 |
| 2,424,825 | 7/1947 | Hogan | 264—30 |
| 2,564,009 | 8/1951 | Hyche | 264—30 |
| 3,351,460 | 11/1967 | Demaison | 264—30 |
| 1,878,870 | 9/1932 | Linder | 264—30 |

FOREIGN PATENTS

| | | | |
|---|---|---|---|
| 579,918 | 8/1946 | Great Britain | 264—30 |
| 836,472 | 6/1960 | Great Britain | 264—30 |

DONALD J. ARNOLD, Primary Examiner

J. H. MILLER, Assistant Examiner

U.S. Cl. X.R.

75—24; 264—30